United States Patent [19]

Horsch

[11] Patent Number: 4,479,563
[45] Date of Patent: Oct. 30, 1984

[54] CRAWLER TRACK TRANSMISSION SYSTEM

[75] Inventor: Rudolf Horsch, Davenport, Iowa
[73] Assignee: J. I. Case Company, Racine, Wis.
[21] Appl. No.: 444,680
[22] Filed: Nov. 26, 1982
[51] Int. Cl.³ ............................................ B62D 11/08
[52] U.S. Cl. ................................. 180/6.7; 192/13 A
[58] Field of Search ............... 180/6.2, 6.7; 192/12 C, 192/13 R, 13 A, 18 A

[56] References Cited

U.S. PATENT DOCUMENTS

| | | | |
|---|---|---|---|
| 3,068,976 | 12/1962 | Kelly | 192/13 R |
| 3,494,449 | 2/1970 | Umeda et al. | 180/6.2 |
| 3,498,427 | 3/1970 | Bingley | 180/6.2 |
| 3,895,703 | 7/1975 | Schmitt et al. | 192/13 R |
| 3,899,058 | 8/1975 | Pasquini | 192/13 R |
| 4,076,107 | 2/1978 | Yasoshima | 192/13 R |
| 4,088,209 | 5/1978 | Drone | 180/6.2 |
| 4,116,291 | 9/1978 | Brungart | 180/6.2 |

Primary Examiner—Joseph F. Peters, Jr.
Assistant Examiner—Kenneth R. Rice
Attorney, Agent, or Firm—Dressler, Goldsmith, Shore, Sutker & Milnamow, Ltd.

[57] ABSTRACT

A transmission control system is provided for enhancing the braking of a crawler-type tractor by controlling the engagement and disengagement of the clutches associated with a right-hand and left-hand crawler tracks in response to the actuation of the brakes associated with the tracks. The arrangement includes pressure sensor means operatively associated with the hydraulic brake system of the right-hand and left-hand crawler tracks of a crawler-type tractor. The system functions such that actuation of both the right-hand and left-hand track brakes simultaneously prevents the normal disengagement of the track clutches which permits the engine of the tractor to assist in braking. Actuation of a single brake pedal allows braking of that respective crawler track with disengagement of its respective clutch, while allowing the clutch of the opposite track to remain engaged to effect pivot turning of the tractor.

7 Claims, 5 Drawing Figures

CRAWLER TRACK TRANSMISSION SYSTEM

FIELD OF INVENTION

This invention relates generally to a crawler-track transmission system for material handling equipment, and more particularly to a transmission control system particularly suited for use in a crawler-type drive tractor with left-hand and right-hand crawler drive tracks providing improved braking characteristics.

BACKGROUND OF THE INVENTION

There are many instances in which enhanced braking capabilities for material handling equipment are desirable. Such capabilities are particularly desirable for crawler-type drive tractors with right-hand and left-hand crawler drive tracks. Because such crawler-type drive tractors are used for a variety of material handling functions, effective braking and precise control for maneuverability are required for efficient operation in areas having restricted space and/or irregular hilly terrain.

Transmission systems for crawler-type drive tractors known previously have been developed which include a clutch and a steering brake for each of the crawler dual tracks. These clutches and steering brakes are selectively hydraulically actuated through mechanical linkages which control hydraulic cylinders and valves.

In many crawler track transmission systems currently in use, hydraulic actuation of the brake for one of the crawler tracks results in disengagement of the clutch for that track, thereby disconnecting the track from the engine of the implement. Clutch disengagement is usually effected hydraulically by providing hydraulic fluid lines which are operatively associated with the brake cylinder for one of the crawler tracks and its respective clutch. Disengagement of the clutch for the track being braked, while the clutch of the other crawler track remains engaged, permits the operator of the implement to execute a so-called pivot turn for manuevering the implement.

While many crawler track transmission systems operate as described above, it will be appreciated that in some instances, disengagement of the crawler track clutches attendant to application of the track brakes is not desirable. This is particularly true when the crawler implement is being used on hilly or irregular terrain. When used on such terrain, it is frequently desirable to take advantage of the braking effect provided by the implement's internal combustion engine to slow the implement. Of course, this requires that the clutches connecting the crawler tracks with the engine remain engaged. However, as noted, many systems function to disengage the track clutches when the track brakes are applied, thus precluding application of the brakes if the clutches connecting the implement engine to the crawler tracks are to remain engaged. Consequently, most previous systems have not been capable of providing both engine braking and normal track braking simultaneously.

In view of the shortcoming of previously known transmission systems, it is desirable to provide a control system which provides enhanced implement braking by permitting application of the crawler track brakes without disengagement of the track clutches so that engine braking is simultaneously provided. Selectable use of such braking capabilities is also desirable, bearing in mind that the system must not impair the normal manueverability of the implement. Preferably, such a system should be readily fabricated and installed, and should be straightforward in construction to facilitate reliable operation.

SUMMARY OF THE INVENTION

The transmission control system embodying the present invention offers greatly enhanced braking capabilities for the implement of which the transmission is part, without impairing the normal manueverability of the implement for efficient operation. The transmission system is particularly suited for use in a crawler-type drive tractor, having left-hand and right-hand crawler drive tracks with associated left-hand and right-hand hydraulic brake and clutch assemblies. The system incorporates selectively activatable override means including an electrical pressure sensor used to regulate the engagement and disengagement of the crawler track clutches to selectively increase the braking capabilities of the implement without detracting from its manueverability. This is accomplished by electrically monitoring the hydraulic fluid line pressure within the hydraulic brake system to control operation of the crawler track clutches.

During operation of the present transmission control system, implement manuevering can be effected by depressing either the left or right brake pedals individually for selective braking of the respective crawler track. Upon actuation of either the right or left brake pedal, the clutch of the respective track is disengaged, while a hydraulic fluid pressure change is sensed by an electrical pressure sensor associated with the hydraulic lines of that particular track brake. Upon detection of such a change, the pressure sensor sends an electrical signal to a lock valve associated with the hydraulic fluid lines to the track clutch of the side opposite the brake pedal being actuated. This locking prevents the clutch associated with that opposite side from disengaging. Hydraulic fluid is free to pass through the open, corresponding lock valve of the side of the system on which the brake pedal is depressed, actuating a transmission control valve associated with the track clutch of the track being braked for disengaging that clutch. Since actuation of either one of the right or left brake pedal only disengages the clutch associated with that respective right-hand or left-hand crawler drive track, while allowing the clutch associated with the opposite crawler drive track to remain engaged, the implement can be manuevered in a normal fashion.

As will be appreciated, the operative interconnection of each of the right-hand and left-hand track brakes with the respective track clutches of the opposite crawler track provides enhanced braking for the implement. Actuation of both brake pedals of the system results in the electrical pressure sensors associated with the hydraulic lines of each track brake to detect a change in the hydraulic pressure, and send an electrical signal to each of the lock valves associated with both the right-hand and left-hand crawler track clutches. Actuation of both lock valves blocks the flow of hydraulic fluid to the transmission valve of the system from the respective track brakes, this flow otherwise acting to disengage the track clutches. Thus, neither of the track clutches are disengaged when both brake pedals are depressed. Since the clutches are connected with the implement engine, the braking effect provided by the engine is used to assist the track brakes in slowing the implement down.

In an alternate embodiment of the present system, the electrical fluid pressure sensors associated with the right-hand and left-hand track brakes are joined in series. In this embodiment, activation of the fluid lock valves, which prevents disengagement of the track clutches, is only effected when both brake pedals are depressed together. Thus, normal manuevering of the implement by braking and clutch-disengagement of one or the other of the crawler tracks is not impaired, while simultaneous actuation of both track brakes results in continued engagement of both track clutches so that engine braking augments the normal track brakes.

Provisions are also preferably included for selective activation and deactivation of the engine braking feature of the present transmission system through mode selection means. Such mode selection means allow normal operation of the hydraulic brake and clutch arrangements without additional engine braking by disengagement of either the right-hand or left-hand track clutch, or disengagement of both clutches, when either the right or left brake pedal is actuated or when both right and left brake pedals are actuated simultaneously.

Numerous other advantages and features of the present invention will become readily apparent from the following detailed description of the invention and embodiments thereof, from the appended claims and from the accompanying drawings in which like numerals are employed to designate like parts throughout the same.

DESCRIPTION OF THE PREFERRED EMBODIMENTS

Figure 1:
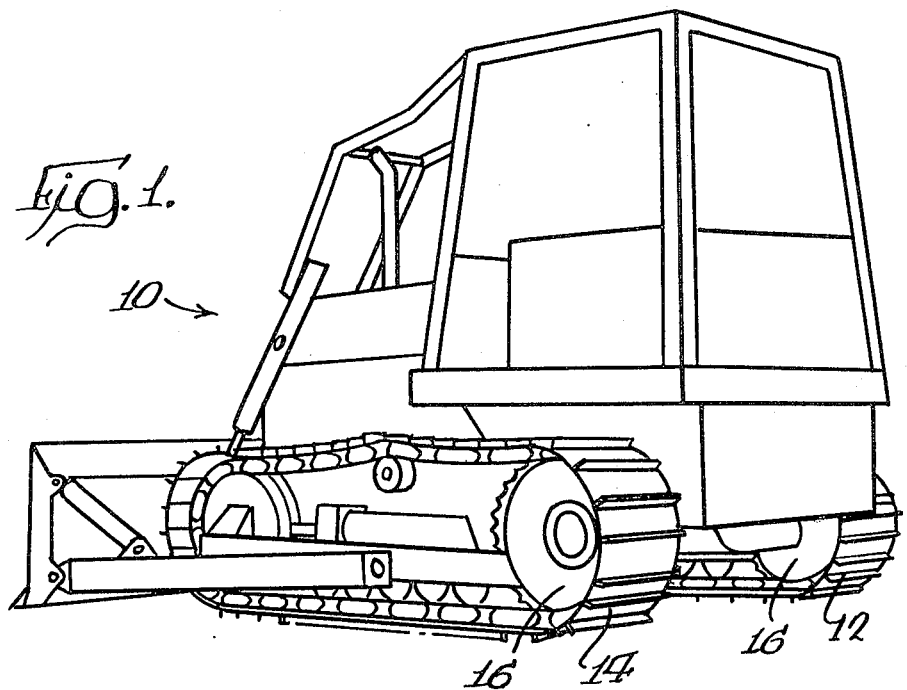
FIG. 1 is a full perspective view of the crawler-type drive tractor having left-hand and right-hand crawler drive tracks.

While this invention is susceptible of embodiment in many different forms, there are shown in the drawings and will be described in detail, alternate embodiments of the present invention. It should be understood, however, that the present disclosure is to be considered as an exemplification of the principles of the invention and is not intended to limit the invention to the embodiments illustrated.

For purposes of the present disclosure, the present transmission control system is described in associated with a material handling implement having independently operable right-hand and left-hand crawler tracks. However, it will be appreciated that the present control system can be readily adapted for implements having other than crawler tracks, such as implements having independently operable right-hand and left-hand drive wheelsets.

FIG. 1 of the drawings discloses a typical crawler-type drive tractor 10 having right-hand and left-hand crawler tracks 12 and 14, respectively, driven by drive sprockets 16. The drive sprockets 16 are operatively connected with transmission assemblies 18 and 20 (FIGS. 2-5) respectively associated with the right-hand and left-hand crawler tracks 12 and 14. The right-hand and left-hand transmission assemblies 18 and 20 respectively include right-hand and left-hand track clutches 22 and 24. Engagement of the right-hand or left-hand clutches 22 or 24 operatively connects an internal combustion engine (not shown) of the crawler tractor 10 to the drive sprockets 16, thereby turning the right-hand and left-hand crawler tracks 12 and 14, for driving tractor 10.

The right-hand and left-hand crawler tracks 12 and 14 are also associated with right-hand and left-hand brake assemblies, respectively generally designated 26 and 28. These brake assemblies respectively include right-hand and left-hand master brake cylinders 30 and 32 connected via right-hand and left-hand conduit lines 34 and 36 to right-hand and left-hand slave brake cylinders 42 and 44. Each of the right-hand and left-hand slave brake cylinders 42 and 44 are respectively operatively connected to right-hand and left-hand crawler track brakes 38 and 40. Selective track brake actuation is effected by an increase in the hydraulic fluid pressure in master brake cylinders 30 and 32 by depression of the right-hand or left-hand brake pedals 46 and 48. Actuation of master cylinders 30 and 32 operates through conduit lines 34 and 36 to operate slave cylinders 42 and 44 for effecting braking of crawler tracks 12 and 14 by track brakes 38 and 40.

In accordance with the present invention, the right-hand and left-hand conduit lines 34 and 36 are also in communication with right-hand and left-hand fluid lock valves 50 and 52. The lock valves 50 and 52 are normally in the unlocked or open position, thereby allowing the hydraulic fluid in the conduit lines 34 and 36 to pass through the lock valves and communicate with a transmission valve 54. The transmission valve 54 is in operative communication with, and effects engagement and disengagement of, the right-hand and left-hand track clutches 22 and 24, respectively.

When fluid flows through lock valves 50 or 52 to transmission valve 54, the respective right-hand and left-hand clutch 22 or 24 is effectively disengaged. This typically occurs attendant to track braking since pressurized fluid from one of master cylinders 30 and 32 flows through the respective one of the lock valves 50 and 52 for disengaging the respective one of the track clutches 22 and 24. Alternatively, if the lock valves 50 and 52 are in the locked or closed position, no fluid will flow to the transmission valve 54 and the right-hand and left-hand clutches 22 and 24 will remain engaged with tracks 12 and 14 operatively connected with the implement engine.

The right-hand and left-hand lock valves 50 and 52 are electrically controlled by a electrical control circuit generally designated 56. The electrical control circuit 56 includes right-hand and left-hand pressure sensors 58 and 60 respectively operatively associated with the right-hand and left-hand master cylinders 30 and 32 by conduit lines 34 and 36. The right-hand and left-hand pressure sensors 58 and 60 monitor the hydraulic fluid pressure in the conduit lines 34 and 36, and produce an electrical output signal when pressure in the respective conduit line increases as a result of depression of the respective one of right-hand and left-hand brake pedals 46 and 48 which actuate the right-hand and left-hand master brake cylinders 30 and 32.

The electrical control circuit 56 preferably further includes an on-off master switch 62 which functions as a master control or override for allowing the selective operative connection of the electrical control circuit 56 with the right-hand and left-hand hydraulic brake assemblies 26 and 28. Upon actuation of the right-hand or left-hand brake pedals 46 or 48, the respective one of left-hand and right-hand pressure sensors 58 and 60 will produce an electrical signal directed to the opposite one of the right-hand and left-hand lock valves 50 and 52. In other words, the signal produced by right-hand pressure sensor 58 is directed to left-hand lock valve 52, while the signal from left-hand pressure sensor 50 is directed to right-hand lock valve 50. For such signals to appear at the lock valves, the master switch 62 must be in the on or connected position. Signals received by the right-hand or left-hand lock valve 50 or 52 will cause the lock valve to position itself in the closed position, thereby preventing hydraulic fluid communication between master cylinders 30 and 32 and the respective one of right-hand and left-hand track clutches 22 and 24 through the transmission valve 54. Thus, when lock valve 50 is closed, actuation of right-hand brake assembly 26 will not result in the usual disengagement of right-hand clutch 22. Similarly, when lock valve 52 is closed, actuation of left-hand brake assembly 28 will not result in the usual disengagement of left-hand clutch 24.

Figure 3:
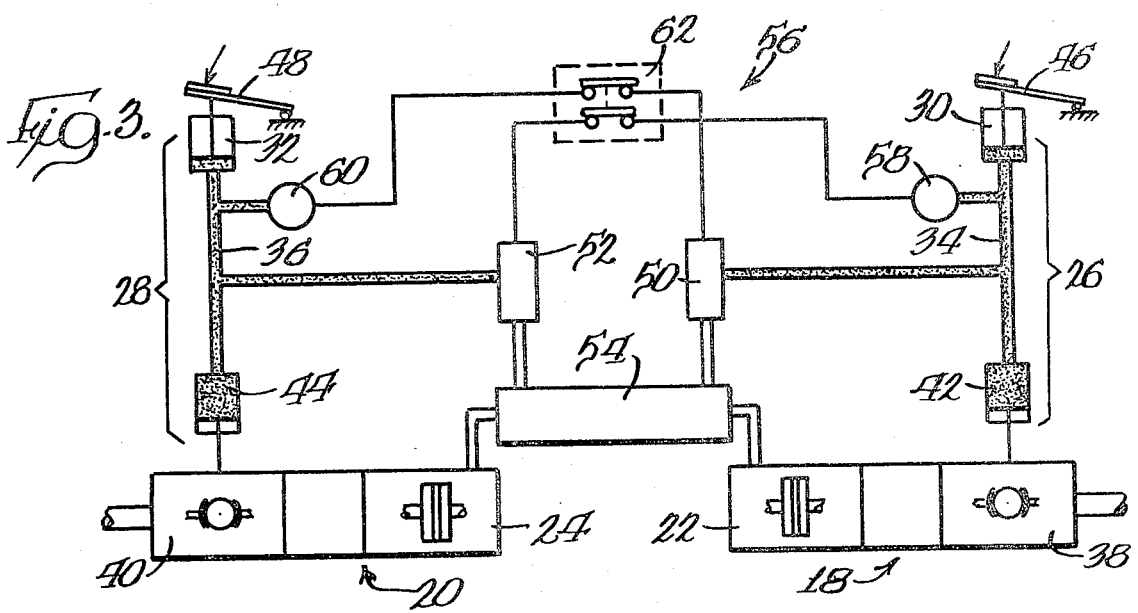
FIG. 3 is a diagrammatic illustration similar to FIG. 2, showing the actuation of both the right-hand and left-hand track brake pedals with the transmission control system activated.
Figure 4:
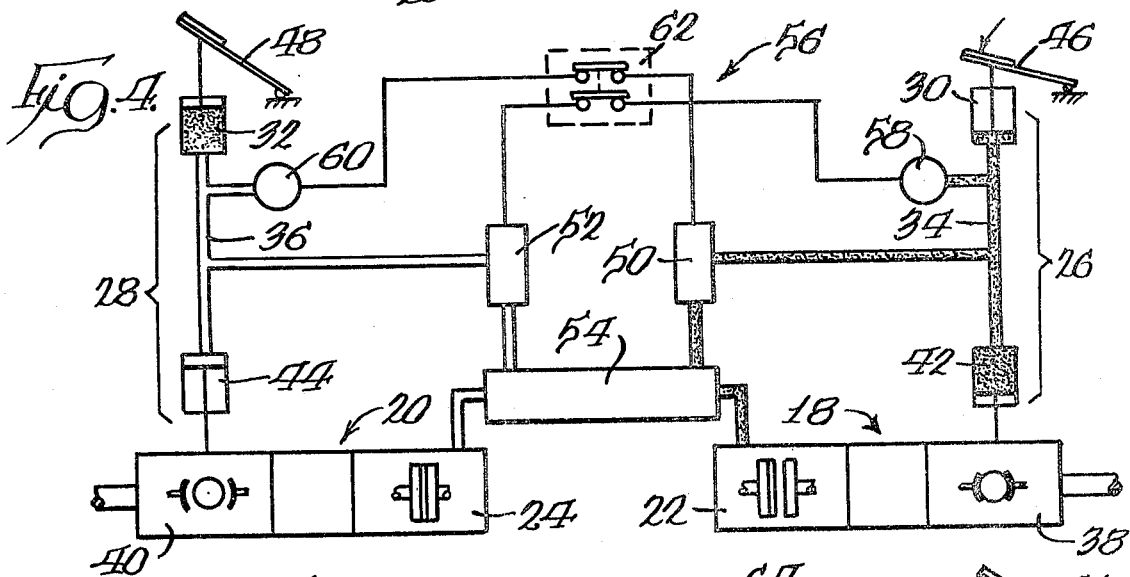
FIG. 4 is a diagrammatic illustration similar to FIG. 3, showing the actuation of the right-hand brake pedal alone with the transmission control system activated.

The operation of the transmission control system of the present invention is best illustrated by referring to FIGS. 3 and 4. FIG. 3 illustrates operation of the transmission control system with both right-hand and left-hand brake pedals 46 and 48 depressed simultaneously, as would be the case when full implement braking is desired, such as when descending a hill or steep grade. When this condition occurs, both right-hand and left-hand master brake cylinders 30 and 32 are actuated causing an increase in the hydraulic fluid pressure in the right-hand and left-hand conduit lines 34 and 36. This increase in hydraulic fluid pressure is monitored by both right-hand and left-hand pressure sensors 58 and 60, causing each to produce an electrical output signal. With master switch 62 in the on position, the electrical output signals will be received by the right-hand and left-hand lock valves 50 and 52. As noted, the right-hand pressure sensor 58 is operatively connected with the left-hand lock valve 52, while the left-hand pressure sensor 60 is operatively connected with the right-hand lock valve 50. Upon receiving the signals from the pressure sensors, the lock valves 50 and 52 will actuate and position themselves in the closed position.

Since the sequencing of this transmission control system is such that the electrical output signals are received by the lock valves 50 and 52 before the hydraulic fluid pressure at the lock valves increases due to actuation of master cylinders 30 and 32, the master cylinders are effectively blocked from communication with the transmission valve 54. This allows both right-hand and left-hand clutches 22 and 24 to remain engaged, while the increase in hydraulic fluid pressure in conduit lines 34 and 36 actuates the right-hand and left-hand slave brake cylinders 42 and 44 to engage the right-hand and left-hand track brakes 38 and 40. The continued engagement of the left-hand and right-hand clutches 22 and 24 provides increased braking effect by utilizing the braking force of the internal combustion engine of the crawler tractor 10. Such engine braking is particularly desirable to assist in slowing crawler tractor 10 when it is descending steep grades.

FIG. 4 illustrates operation of the transmission control system upon actuation of only one brake pedal. This would normally occur during manuevering of tractor 10, such as by a so-called pivot turn. The operation of the transmission control system is essentially similar with respect to actuation of only one of either the right-hand or left-hand brake pedals 46 or 48, and thus the operation of the system will be described actuating only the right-hand brake pedal 46.

Upon actuation of the right-hand brake pedal 46, the right-hand master brake cylinder 30 is displaced causing an increase in the hydraulic fluid pressure in the right-hand conduit line 34. This increase in pressure is sensed by the right-hand sensor 58 and an electrical output signal is transmitted to and received by the left-hand lock valve 52. This electrical output signal signals the left-hand lock valve 52 to move to the closed position to prevent hydraulic fluid in the left-hand conduit line 36 from communicating with the transmission valve 54 thus, preventing the left-hand clutch 24 from disengaging. This is consistent with the normally desired operation of the crawler tracks, since during manuevering by braking of one of the crawler tracks, it is usually desired to have the clutch operating the other of the crawler tracks to remain engaged.

Since the left-hand brake pedal 48 is not actuated, there is no increase in the left-hand conduit line fluid pressure, no electrical output signal is transmitted from pressure sensor 60 to the right-hand lock valve 50, and thus, the right-hand lock valve 50 remains open. Since the right-hand lock valve 50 is in its normally open position, pressure from the right-hand conduit line 34 pressurizes the transmission valve 54 resulting in disengagement of right-hand clutch 22.

The increase in pressure within the right-hand conduit line 34 also actuates right-hand slave cylinder 42, thereby engaging the right-hand track brake 38. The actuation of the right-hand brake pedal alone allows the right-hand crawler track 12 to be slowed and/or stopped by the right-hand brake 38, while the left-hand crawler track 14 is being driven by the left-hand transmission assembly 20. This allows the crawler tractor 10 to effect a pivot turn to the right. A similar turn to the left can be effectuated by depressing the left-hand brake pedal 48 only. Operation of the transmission control system in this way effectuates desired maneuverability and positional control of the crawler tractor 10 which is necessary for efficient material handling.

Figure 5:
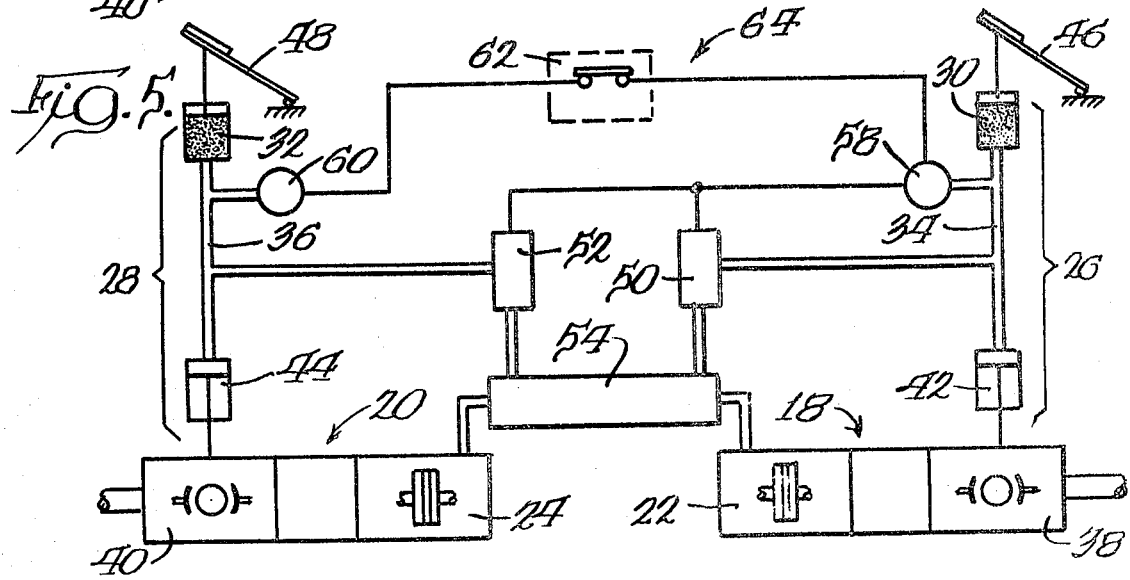
FIG. 5 is a diagrammatic illustration of an alternate embodiment of the electrical control circuitry of the present transmission control system.

An alternate embodiment of the electrical control circuit 56 is illustrated in FIG. 5. The modified electrical control circuit 64 is substantially identical in operation to that disclosed in FIGS. 2, 3 and 4 with the following exception: the right-hand and left-hand pressure sensors 58 and 60 are electrically connected in a series; as a consequence, only by actuation of both the right-hand and left-hand brake pedals 46 and 48 simultaneously will an electrical output signal be produced to close the right-hand and left-hand lock valves 50 and 52.

Figure 2:
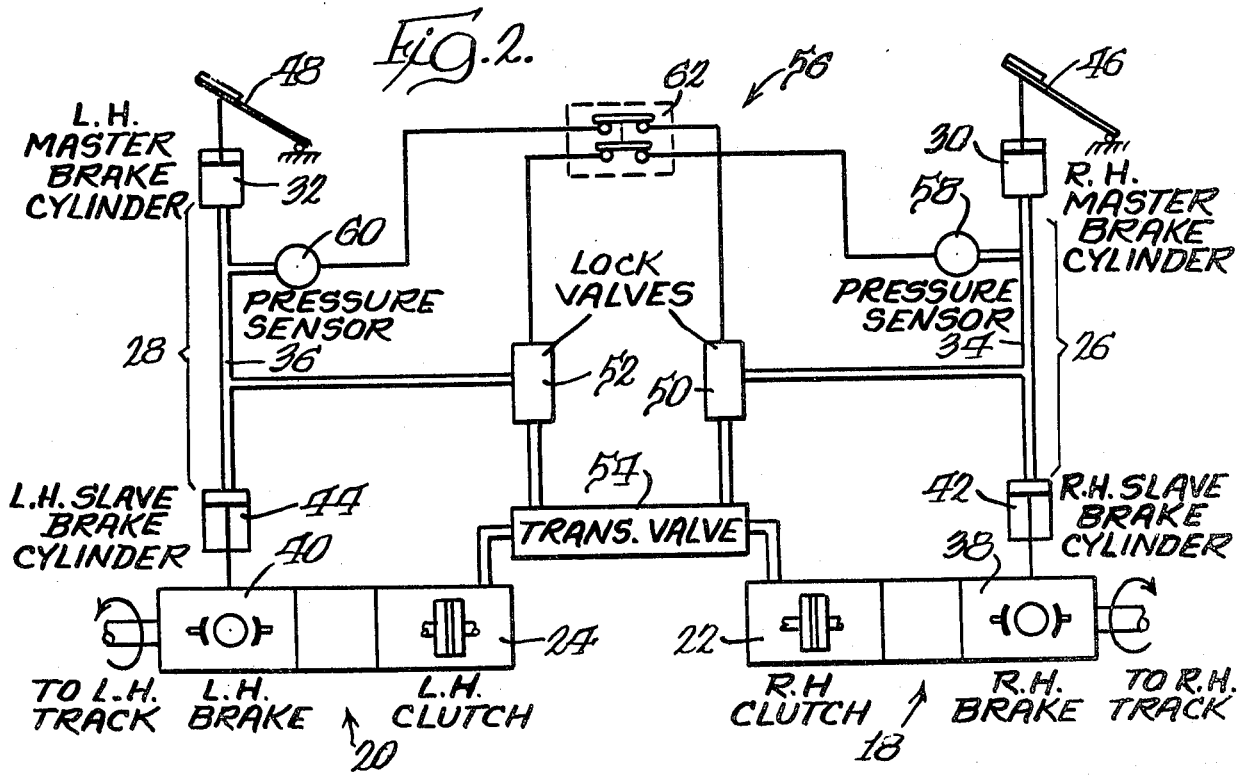
FIG. 2 is a diagrammatic illustration showing the hydraulic and electrical circuits as well as associated parts of the present transmission control system.

Thus, like reference numerals have been retained in FIG. 5 for elements of the alternate system embodiment since they are identical to the elements disclosed in the embodiment of FIGS. 2, 3 and 4.

The master switch 62 must be in the on or connected position for the modified electrical control circuit to be in operative communication with the right-hand and left-hand conduit lines 34 and 36. To effect this communication, right-hand and left-hand pressure sensors 58 and 60 monitor the pressure in conduit lines 34 and 36.

The actuation of the right-hand brake pedal 46 increases the pressure in right-hand master brake cylinder 30 and right-hand conduit line 34. This increase in pressure is detected by the right-hand pressure sensor 58, but since no completed electrical path exists to the lock valves 50 and 52, no output signal is communicated thereto. Similarly, depression of left-hand brake pedal 48 only does not effect closing of either lock valve 50 or 52. If, however, the left-hand brake pedal 48 is depressed while the right-hand brake pedal 46 is being depressed, the modified electrical control circuit 64 will be completed since both right-hand and left-hand pressure sensors 58 and 60 will respectively detect an increase in pressure in conduit lines 34 and 36. The resultant electrical output signal flows to both the right-hand and left-hand lock valves 50 and 52, and the lock valves will both move to their closed positions, effectively blocking the communication of hydraulic fluid pressure from lines 34 and 36 with transmission valve 54. The increase in pressure effectuated by actuation of the right-hand and left-hand brake pedals 46 and 48 will allow the right-hand and left-hand slave brake cylinders 42 and 44 to actuate the right-hand and left-hand brakes 38 and 40. This braking effect of the right-hand and left-hand crawler tracks 12 and 14 will be assisted by the engine associated with crawler tractor 10 since the blocking of pressurized fluid to transmission valve 54 will allow the right-hand and left-hand clutches 22 and 24 to remain engaged.

As will be appreciated, the function of the modified electrical control circuit 64 is essentially identical to that of the electrical control circuit 56 of the embodiment of FIGS. 2, 3 and 4 when both the right-hand and left-hand brake pedals 46 and 48 are actuated simultaneously. Similarly, the operation of the modified electrical circuit 64 allows for independent braking of either the right-hand or left-hand crawler track, while allowing the track clutch of the opposite track to remain engaged for manuevering.

Thus, it can be seen that the transmission control system of the present invention permits continued engagement of the crawler track clutches during simultaneous actuation of the right-hand and left-hand track brakes in order to effect engine braking concurrently with normal track braking. Additionally, when either of the right-hand or left-hand track brakes are actuated individually, the crawler track associated with that particular brake will effectively be slowed or stopped while the clutch associated with that track is disengaged. The clutch associated with the opposite crawler track will remain engaged, thereby allowing the crawler tractor to execute a pivot turn to the braked track side in a normal manner.

What is claimed is:

1. A transmission control system for a crawler drive having right-hand and left-hand crawler tracks respectively driven by a transmission assembly having right-hand and left-hand clutch means for selective delivery of power to a respective one of said tracks, and right-hand and left-hand brake means for selective braking of a respective one of said tracks, comprising:

right-hand brake cylinder means selectively operable for selectively applying said right-hand brake means;

left-hand brake cylinder means selectively operable for selectively applying said left-hand brake means;

right-hand conduit means associated in fluid communication with said right-hand brake cylinder means and said right-hand clutch means whereby activation of said right-hand brake cylinder means normally supplies pressurized fluid to said right-hand clutch means for disengagement thereof;

left-hand conduit means associated in fluid communication with said left-hand brake cylinder means and said left-hand clutch means whereby activation of said left-hand brake cylinder means normally supplies pressurized fluid to said left-hand clutch means for disengagement thereof; and selectively activatable override means associated with said right-hand and left-hand brake cylinder means and said right-hand and left-hand conduit means so that activation of said override means results in continued engagement of said right-hand and left-hand clutch means when said right-hand and left-hand brake cylinder means are operated simultaneously to apply both said right-hand and left-hand brake means, said override means comprising fluid pressure sensing means associated with said right-hand and left-hand brake cylinder means, and selectively closeable valve means associated with said right-hand and left-hand conduit means and said pressure sensing means, whereby simultaneous operation of said right-hand and left-hand brake cylinder means activates said pressure sensing means to close said valve means and block fluid flow to said right-hand and left-hand clutch means from said right-hand and left-hand brake cylinder means, said pressure sensing means comprising a right-hand electrical pressure sensor associated with said right-hand brake cylinder means for sensing operation thereof, and a left-hand electrical pressure sensor associated with said left-hand brake cylinder means for sensing operation thereof, said valve means comprising an electrically operable right-hand fluid lock valve disposed in fluid communication with said right-hand conduit means for selectively blocking fluid flow from said right-hand brake cylinder means to said right-hand clutch means, and an electrically operable left-hand fluid lock valve disposed in fluid communication with said left-hand conduit means for selectively blocking fluid flow from said left-hand brake cylinder means to said left-hand clutch means.

2. The crawler drive control system in accordance with claim 1, wherein said override means further comprises electrical circuit means connecting said right-hand and left-hand pressure sensors and said right-hand and left-hand lock valves in series.

3. The crawler drive control system in accordance with claim 1, wherein said override means comprises electrical circuit means operatively electrically joining said right-hand pressure sensor with said left-hand lock valve, and joining said left-hand pressure sensor with said right-hand lock valve, so that activation of said right-hand pressure sensor closes said left-hand lock valve, and activation of said left-hand pressure sensor closes said right-hand lock valve.

4. A crawler track transmission system, comprising:
a right-hand transmission assembly for supplying power to a right-hand crawler track from associated engine means, including selectively engageable right-hand clutch means for transferring power from said engine means to said right-hand crawler track, and selectively operable fluid activated right-hand brake means for braking said right-hand crawler track;
a left-hand transmission assembly for supplying power to a left-hand crawler track from said associated engine means, including selectively engageable left-hand clutch means for transferring power from said engine means to said left-hand crawler track, and selectively operable fluid activated left-hand brake means for braking said left-hand crawler track;
right-hand brake cylinder means selectively operable for supplying pressurized fluid to said right-hand brake means for selective activation thereof;
left-hand brake cylinder means selectively operable for supplying pressurized fluid to said left-hand brake means for selective activation thereof;
right-hand fluid conduit means associated with said right-hand brake cylinder means and said right-hand clutch means whereby selective operation of said right-hand brake cylinder means normally supplies pressurized fluid to said right-hand clutch means for selective operative disengagement thereof;
left-hand fluid conduit means associated with said left-hand brake cylinder means and said left-hand clutch means whereby selective operation of said left-hand brake cylinder means normally supplies pressurized fluid to said left-hand clutch means for selective operative disengagement thereof; and
electrical pressure sensing means associated with said right-hand and left-hand brake cylinder means, and selectively closeable valve means associated with said right-hand and left-hand conduit means and said electrical pressure sensing means, whereby simultaneous operation of said right-hand and left-hand brake cylinder means activates said electrical pressure sensing means to close said valve means and block fluid flow to said right-hand and left-hand clutch means from said right-hand and left-hand brake cylinder means for selectively effecting engine braking of said right-hand and left-hand crawler tracks.

5. The crawler track transmission system in accordance with claim 4, wherein
said electrical pressure sensing means comprises a right-hand electrical pressure sensor associated with said right-hand brake cylinder means for sensing the operation thereof, and a left-hand electrical pressure sensor associated with said left-hand brake cylinder means for sensing operation thereof,
said valve means comprising an electrically operable right-hand fluid lock valve disposed in fluid communication with said right-hand conduit means for selectively blocking fluid flow from said right-hand brake cylinder means to said right-hand clutch means, and an electrically operable left-hand fluid lock valve disposed in fluid communication with said left-hand brake cylinder means for selectively blocking fluid flow from said left-hand brake cylinder means to said left-hand clutch means.

6. The crawler track transmission system in accordance with claim 5, wherein
said electrical pressure sensing means comprises electrical circuit means connecting said right-hand and left-hand electrical pressure sensors and said right-hand and left-hand electrically operable fluid lock valves in series.

7. The crawler track transmission system in accordance with claim 5, wherein
said electrical pressure sensing means comprises electrical circuit means operatively electrically joining said right-hand electrical pressure sensor with said left-hand fluid lock valve, and joining said left-hand electrical pressure sensor with said right-hand fluid lock valve, so that acutation of said right-hand electrical pressure sensor closes said left-hand fluid lock valve, and actuation of said left-hand electrical pressure sensor closes said right-hand fluid lock valve.

* * * * *